United States Patent [19]

Brennan et al.

[11] Patent Number: 4,463,252
[45] Date of Patent: Jul. 31, 1984

[54] NIGHT VISION GOGGLE SYSTEM

[75] Inventors: Thomas M. Brennan, Cambridge; Robert M. Burley, Concord, both of Mass.

[73] Assignee: Baird Corporation, Bedford, Mass.

[21] Appl. No.: 337,023

[22] Filed: Jan. 4, 1982

[51] Int. Cl.³ .......................... H01J 40/14; H01J 40/00
[52] U.S. Cl. ............................... 250/213 VT; 313/524
[58] Field of Search .............. 350/538, 547, 548, 549, 350/474, 475, 476, 145; 250/213 VT, 341; 313/523, 524

[56] References Cited

U.S. PATENT DOCUMENTS

| | | | |
|---|---|---|---|
| 395,872 | 1/1889 | Briggs | 350/145 |
| 3,454,773 | 7/1969 | Bulthuis et al. | 250/213 VT |
| 3,517,984 | 6/1970 | Lindstedt et al. | 350/475 |
| 3,787,688 | 1/1974 | Stone | 250/213 VT |
| 4,124,798 | 11/1978 | Thompson | 250/213 VT |
| 4,132,889 | 1/1979 | Groenweg | 250/213 VT |
| 4,171,480 | 10/1979 | Wulms | 250/213 VT |
| 4,266,848 | 5/1981 | Schlegel | 250/213 VT |
| 4,312,572 | 1/1982 | Yamashita et al. | 350/476 |

Primary Examiner—David C. Nelms
Assistant Examiner—E. Austin, II
Attorney, Agent, or Firm—Morse, Altman & Dacey

[57] ABSTRACT

A night vision goggle system comprising a housing, an optical system accommodated therein and including a pair of eyepiece assemblies, with each assembly slidably mounted for interpupillary adjustment. The assemblies are respectively focusable. The optical system further includes an objective lens assembly, an image intensifier tube provided with concave-faced fiber optics, and a collimator lens assembly, all in axial alignment, and a splitter member. The objective, collimator and eyepiece assemblies feature prescription optics.

The goggle system preferably is head mounted via a quick-release connection to a face mask provided with an adjustable strap assembly.

17 Claims, 9 Drawing Figures

NIGHT VISION GOGGLE SYSTEM

BACKGROUND OF THE INVENTION

1. Field of the Invention

The present invention relates generally to night vision goggles and, more particularly, to a night vision goggle system of improved construction, featuring prescription optics.

2. The Prior Art

Night vision goggles are binocular viewers that operate at very low light levels to allow the user to see and move in the dark. Night vision goggles represent a compromise among conflicting and competing requirements. They should be compact, light weight, cost effective and yet provide acceptable image quality.

Most known night vision goggles have traded compactness, cost effectiveness and weight in order to achieve acceptable image quality. For, it is in the design of the optics, more than in any other part of the goggles, that these competing requirements have to be worked out. Current designers, when faced with the requirement of providing a quality image for the goggles, have tended to think in terms of providing elaborate optics, both regarding the numbers and the quality of the lenses. For instance, present night vision goggles achieve two-eyed operation by means of two complete systems: an objective lens asssembly, an image intensifier tube and an eyepiece—one such system for each eye. Such elaborate optics, however, can only be achieved at the expense of adding to the size, weight and to the cost of the goggles.

There is thus a continuing need for night vision goggles that achieve a more favorable balance among these competing design considerations.

SUMMARY OF THE INVENTION

It is a principal object of the present invention to provide a night vision goggle system that strikes a more favorable balance among competing design considerations than goggles presently known.

More specifically, it is an object of the present invention to provide a night vision goggle system characterized by excellent image quality and yet being compact, light weight and cost effective. It is a further object of the present invention to provide a night vision goggle system comprising a housing and an improved optical system, featuring prescription optics, accommodated within the housing. Preferably, the optical system includes a pair of eyepiece assemblies, with each assembly slidably mounted for interpupillary adjustment. Preferably, the eyepiece assemblies are individually focusable. The optical system further includes only one focusable objective lens assembly, one image intensifier tube provided with concave-faced fiber optics, and a collimator lens assembly, all in axial alignment. A splitter member, mounted between the collimator lens assembly and the pair of eyepiece assemblies, provides two-eyed viewing by sharing the output of the single image intensifier tube. The objective, collimator and eyepiece assemblies feature prescription optics. Preferably, an integral infra red (I. R.) illuminator provides illumination for short distances, including an indicator to the user that the illumination is operational. A detachable optical accessory, designed to be mounted over the I. R. illuminator, adapts the same to a narrow field of view (F. 0. V.) illumination effective at distances between about 100 to about 250 yards. The goggle system of the invention preferably is head mounted via an adjustable quick-release connection to a face mark provided with an adjustable strap assembly.

Other objects of the present invention will in part be obvious and will in part appear hereinafter.

The invention accordingly comprises the night vision goggle system of the present disclosure, its components, parts and their interrelationships, the scope of which will be indicated in the appended claims.

BRIEF DESCRIPTION OF THE DRAWINGS

For a fuller understanding of the nature and objects of the present invention, reference is to be made to the following detailed description, which is to be taken in connection with the accompanying drawings, wherein.

DETAILED DESCRIPTION OF THE PREFERRED EMBODIMENT

In general, the present invention provides a night vision goggle system 10 that is compact, light weight, cost effective and is characterized by excellent image quality. Night vision goggles are binocular viewers that operate at very low light levels to allow the user to see and move in the dark.

The Mechanical Design

The night vision goggle system 10 essentially comprises a housing, formed of a front part 12 and a rear part 14. An optical system is accommodated within the parts 12 and 14 of the housing. Preferably, the parts 12 and 14 of the housing are formed of a light-weight metal, such as for example aluminum, coated with black dye. Preferably, the parts 12 and 14 of the housing are constructed so as to enable the goggle system 10 to be operational over a temperature range of about +45° C. to about −45° C., and in an environment of up to 99% humidity. The parts 12 and 14 of the housing also are able to withstand a water pressure encountered when the goggle system 10 is immersed in three feet of water, and to withstand being exposed to vibration of ten to fifty-five Hz at 0.050-inch displacement, or fifty to 2,000 Hz at 5 g., all without adverse effects on the goggle system 10.

Figure 1:
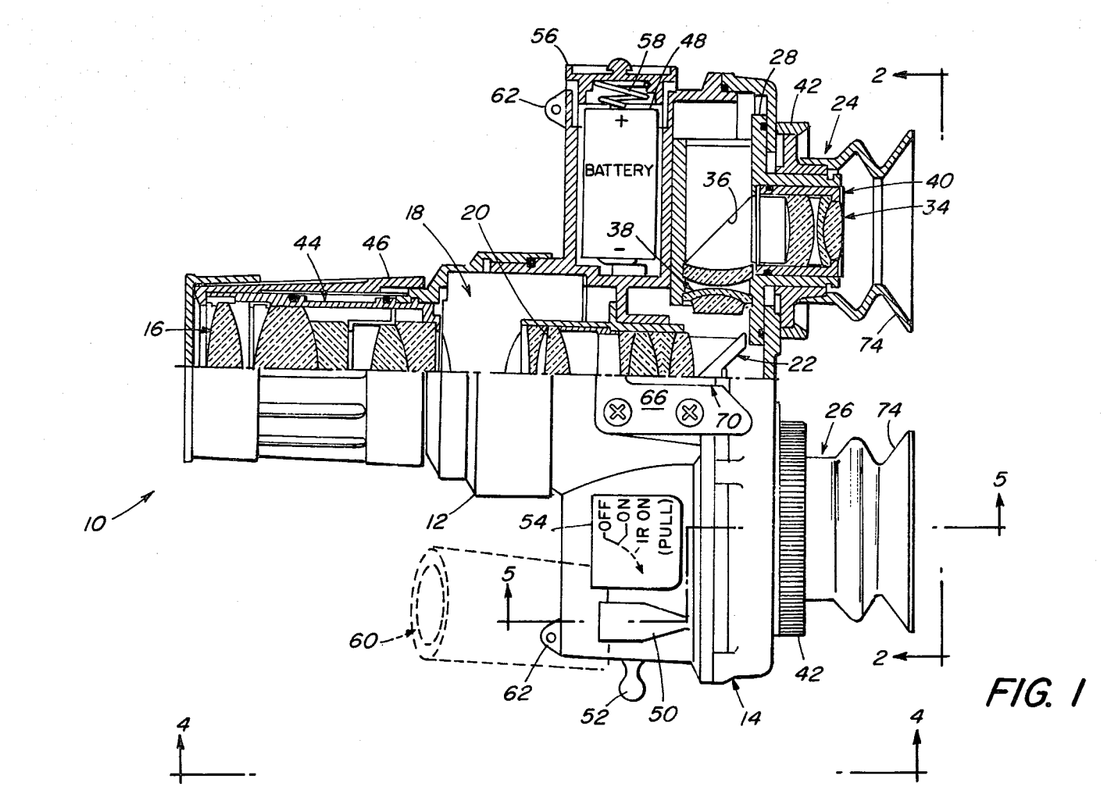
FIG. 1 is a plan view, partly in horizontal section, of a night vision goggle system constructed in accordance with the present invention.
Figure 2:
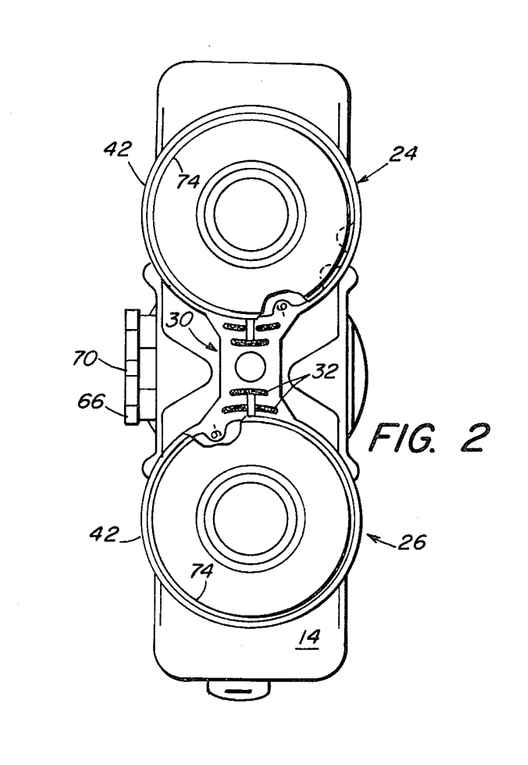
FIG. 2 is an end elevation in the direction of the arrows 2—2 of the goggle system of FIG. 1.
Figure 3:
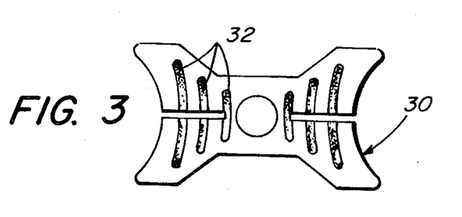
FIG. 3 is a plan view of a component of the goggle system of FIG. 1.
Figure 4:
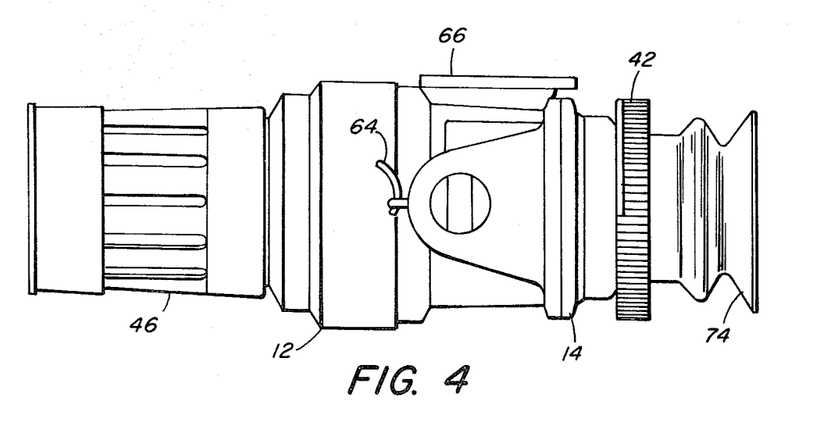
FIG. 4 is a side elevation in the direction of the arrows 4—4 of the goggle system of FIG. 1.
Figure 5:
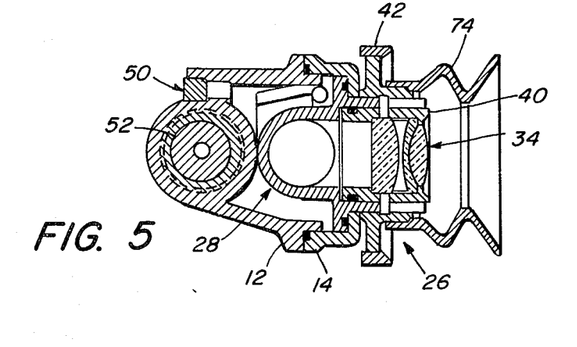
FIG. 5 is a vertical section along the lines 5—5 of the goggle system of FIG. 1.

An optical system is accommodated within the front and rear parts 12 and 14 of the housing. The optical system comprises an objective lens assembly 16, an image intensifier tube 18, a collimater lens assembly 20, all mounted in optical axial alignment within the front part 12 of the housing. A splitter member 22 is mounted adjacent the collimator lens assembly 20 and concentric with the optical alignment axis. The splitter member 22 separates the above-described portions of the optical system from a pair of eyepiece assemblies 24 and 26, mounted for the most part in the rear part 14 of the housing. Furthermore and more importantly, each of the eyepiece assemblies 24 and 26 is contained within its respective sub-housing 28. Each sub-housing 28 in turn is slidably mounted in the housing, more specifically in the rear part 14 thereof. The range of slide for each eyepiece assembly 24 and 26 preferably is about 9 mm. so as to provide an interpupillary adjustment from about fifty-five to about seventy-two mm. In order to facilitate individual user adjustment, a pupillary marking plate 30, provided with a number of arcuate markings 32, preferably is attached to the rear part 14 of the housing in between the eyepiece assemblies 24 and 26, as may be best observed in FIG. 2.

Each of the eyepiece assemblies 24 and 26 includes a focusing subassembly 34, a replicated mirror ($M_1$) 36, and a second subassembly 38. All these of three parts 34, 36 and 38 move in unison with the subhousing 28 within the range of sliding motion just described. Additionally, the focusing subassembly 34 of each eyepiece assembly 24 and 26 is mounted within a sleeve 40. Sleeve 40 is, in turn, axially displaceable within the subhousing 28 over a limited range. This axial displacement is imparted to the sleeve 40 by rotating a focusing ring 42 operatively associated with the sleeve 40. By axially displacing the focusing subassembly 34 via rotating the ring 42, individual eyepiece focus from +2 to −6 diopter is provided to the user of the night vision goggle system 10.

Likewise, the objective lens assembly 16 is disposed within a sleeve 44 in the front part 12 of the housing. This sleeve 44 also is axially displaceable over a limited range by rotating a focusing outer sleeve 46 operatively associated with the sleeve 44. The objective lens focus of the night vision goggle system 10 thus can be adjusted from about twenty cm to infinity by rotating the focusing outer sleeve 46. The rotational displacement of the focusing outer sleeve 46 preferably is over an 135° arc so as to provide the user a quick-turn focus control thereby.

The front part 12 of the housing also accommodates a battery 48 on the one side and an optional infrared (I.R.) light emitting diode (L. E. D.) 50. The I. R. - L. E. D. 50 provides the night vision goggle system 10 with a wide field of view (F. 0. V.) illumination designed for short distances not exceeding three feet. With the I. R. - L. E. D. 50 on, the user can accomplish such close order tasks as map reading, vehicle repair, etc. Preferably, the optical system is provided with an indicator (not shown) visible to the user of the goggle system 10, that the I. R. - L. E. D. 50 is on, since it represents an emitted detectable light. The battery 48 preferably is a 2.8 V, "Eveready" type E 132 battery or its equivalent, and is designed to power both the image intensifier tube 18 and the I. R. - L. E. D. 50. A three-position rotary switch 52 is provided in the front part 12 of the housing adjacent the I. R. - L. E. D. 50. As the user may conveniently note on a plate 54 attached on the front part 12 of the housing, a quick-turn rotation of the switch 52 from a position marked OFF to a position marked ON will activiate the battery 48 and thereby render the night vision goggle system 10 operational. A short pull of the switch 52 will turn on the I. R. - L. E. D. 50, also actuate the indicator, which is visible through the optical system, to warn the user that this detectable light is working.

The battery 48, which provides about twelve hours continuous operational time to the goggle system 10, is replaceably mounted behind a rotatably secured cover 56 and is securely held in place by a compression spring 58. If arctic use for the goggle system 10 is foreseen, the goggle system 10 preferably is provided with an arctic adapter, not shown. Such arctic adapters are well known in the art, and essentially comprise a battery case that can be carried on the user's person, as in a breast pocket, and a cable conductor to establish electrical connection between the battery case and the goggle system 10.

The night vision goggle system 10 also can be provided with a detachable optical accessory 60, shown in dotted lines, designed to be mounted over the I. R. - L. E. D. 50 on the front part 12 of the housing. The detachable optical accessory 60 is designed optically to modify the wide F. 0. V. illumination emanating from the I. R. - L. E. D. 50 to a narrow F. 0. V. illumination good for distances between about 100 to about 250 yards. The optical accessory 60 achieves this by converging the wide illumination of the I. R. - L. E. D. 50 to about a one degree diameter beam of illumination.

The front part 12 of the housing preferably also is provided with a pair of eyelets 62 designed to accommodate the respective ends of a thong 64, by which the night vision goggle system 10 may be conveniently slung about the user's neck. Preferably, however, the night vision goggle system 10 is head mounted. It is head mounted via a quick release connection 66 to a face mask 68. The quick release connection 66 is secured on top of the front part 12 of the housing, and is in alignment with the optical axis of the objective lens assembly 16. Essentially, the quick release connection 66 is a plate provided with a central channel 70, having a number of indented stops. A prong member 72, mounted on the mask 68, is designed to engage the central channel 70 of the quick release connection 66. Because of the presence of the number of indented stops in the channel 70, the mating of the quick release connection 66 with the prong member 72 can be arrested at any one of these indented stops. As a consequence, the user can fit the night vision goggle system 10 as close to his face as he wishes, both to achieve maximum comfort and good vision. In order to enhance both user comfort and vision, each of the pair of eyepiece assemblies preferably is provided with soft, flexible bellows 74, of the slip-on type. The preferred eye relief distance is about fifteen mm.

Figure 6:
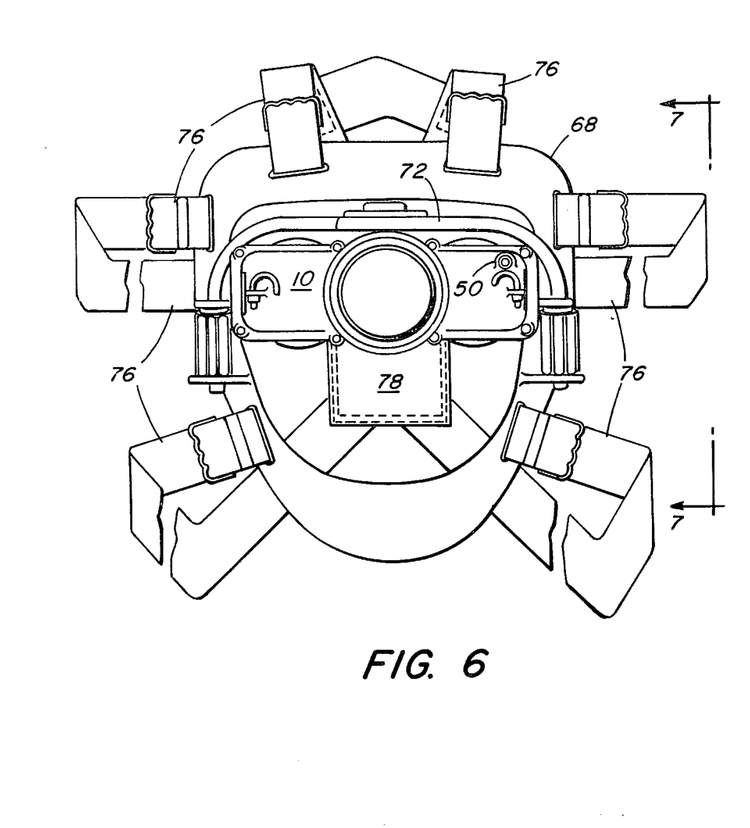
FIG. 6 is a front elevation of the night vision goggle system of FIG. 1 mounted to a face mask provided with an adjustable strap assembly.
Figure 7:
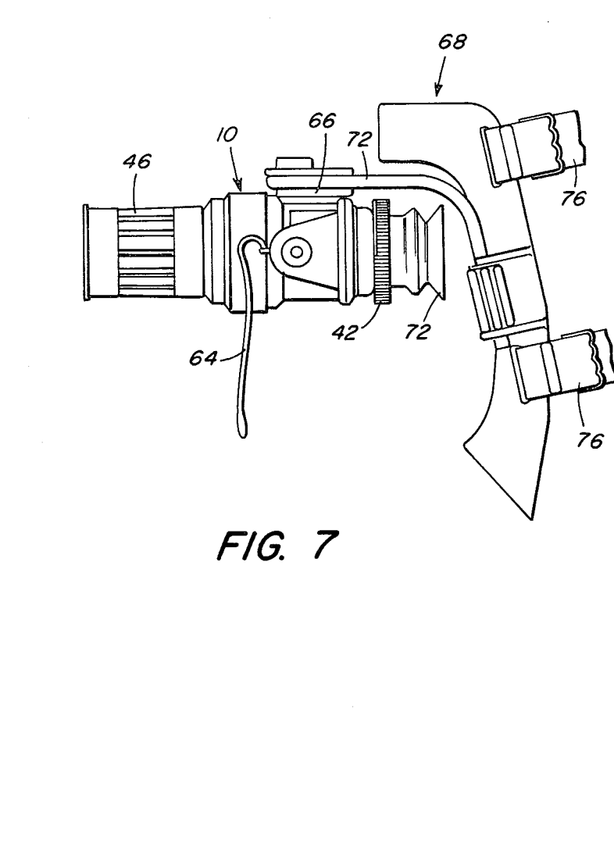
FIG. 7 is a side elevation in the direction of the arrows 7—7 of the goggle system and the face mask of FIG. 6.

The face mask 68, observe FIGS. 6 and 7, preferably is provided with a six-point adjustable strap assembly 76 connected to a skull pad 78. It confers nonrestrictive night vision capability on the user by allowing him/her the full use of both hands. The weight of the night vision goggle system 10, without the face mask 68 and the strap assembly 76, is about 454 grams, one of the lightest among such goggles presently known. The field of view (F. 0. V.) of the goggle system 10 is forty degrees, its magnification is unity. The preferred focal length of its objective lens assembly 16 is about 26.6 mm, and its relative aperture is f/1.

The Optical System

The desired advantages of the night vision goggle system 10, namely of its being compact, light-weight, cost effective and yet of high performance quality, derive for the most part from its unique optical system. This unique optical system built into the night vision goggle system 10 essentially includes the image intensifier tube 18, optically modified, and the objective 16, collimator 20 and eyepiece assemblies 24 and 26 featuring prescription optics. The prescription optics of the objective 16, collimator 20 and eyepiece assemblies in turn derive from and are based on, at least partly, the optically modified image intensifier tube 18. This optical modification in the image intensifier tube 18 involves its fiber optics, more particularly, in designing the fiber optics with curved faces, as more fully described below.

Figure 8:
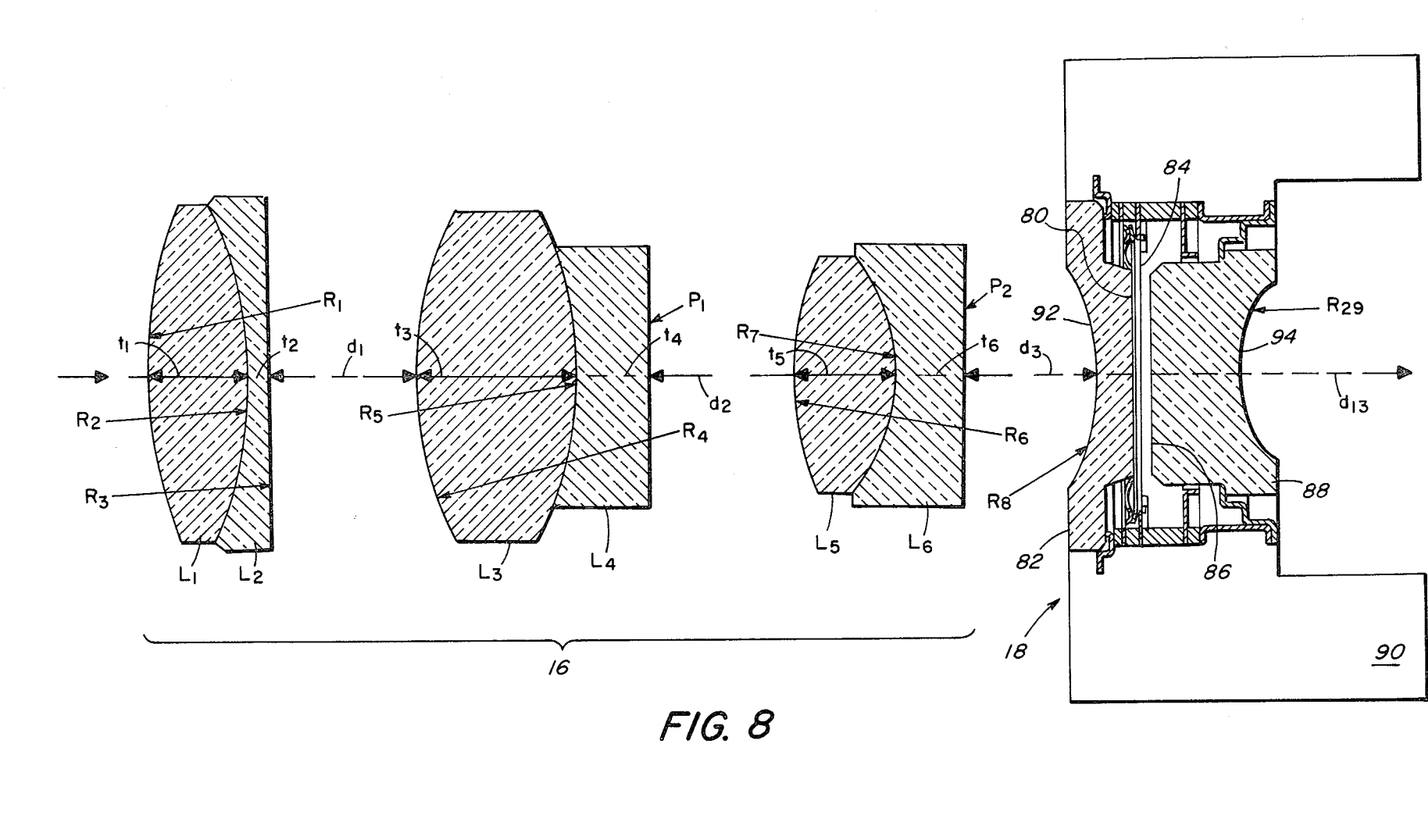
FIG. 8 is an exploded schematic view, on an enlarged scale, of a portion of the optical system of the night vision goggle system of FIG. 1.

The preferred image intensifier tube 18 used in the night vision goggle system 10 is a second generation 18 mm noninverting, microchannel plate (MCP), proximity focused, image intensifier currently made by the electron tube division of Litton Industries. It is pointed out, however, that any like quality image intensifier can be equally well employed in the goggle system 10 of the invention, provided it is optically modified as described herein. In fact, any third or successive generation of image intensifier likewise may be employed. The image intensifier tube 18 comprises a photocathode 80 deposited on a fiber optic input window 82, a disc-shaped, microchannel plate (MCP), continous dynode electron multiplier 84, and a phosphor screen 86 deposited on a twisted fiber optic output window 88. A ring-shaped power supply 90 surrounds the tube 18. Originally, both the fiber optic input window 82 and the fiber optic output window 88 have flat input and output surfaces. These originally flat input and output fiber optic surfaces have been given concave-faced surfaces 92 and 94, respectively. The concave-faced input surface 92 of the fiber optic input window 82 is formed with a radius of curvature $R_8$. The concave-faced output surface 94 of the fiber optic output window 88, on the other hand, is formed with a radius of curvature $R_{29}$. If the input surface 92 were flat, the objective lens assembly 16 would have to contain more than the six lenses it does contain, and the lenses themselves also would have to be more powerful in order for it to achieve the same high degree of image quality. The addition of more lenses, and in particular, more powerful lenses, of course, adds to size, weight and cost of the resultant goggle system. Conversely, by having the concave-faced input surface 92 on the fiber optic input window 82, excellent image quality is obtained in the goggle system 10 with only the six lenses $L_1$–$L_6$ comprising the objective lens assembly 16.

The following Table I gives a preferred mode of prescription for the objective lens assembly 16 of the night vision goggle system 10 of the invention, including the preferred radius of curvature $R_8$ of the concave-faced input surface 92:

TABLE I

Objective Lens Assembly

| Lenses | Glass I.D. Nos. | Radii (mm) | Thickness and Spacing (mm) | Refractory Indices (n) at Wavelengths (λ) in Nanometers: | | |
|---|---|---|---|---|---|---|
| | | | | $\lambda_1$ (546 nm) | $\lambda_2$ (706 nm) | $\lambda_3$ (852 nm) |
| $L_1$ | 533580 | $R_1 = 39.129003$ | $t_1 = 7.999999$ | 1.535340 | 1.528770 | 1.525420 |
| | | $R_2 = 32.156408$ | | | | |
| $L_2$ | 683445 | $R_3 = -1000.000393$ | $t_2 = 1.564999$ | 1.686370 | 1.675610 | 1.670420 |
| | | | $d_1 = 0.782499$ | | | |
| $L_3$ | 620635 | $R_4 = 28.1682$ | $t_3 = 13.302490$ | 1.622470 | 1.615480 | 1.611920 |
| | | $R_5 = 31.546746$ | | | | |
| $L_4$ | 706303 | | $t_4 = 6.259997$ | 1.711350 | 1.695380 | 1.687980 |
| | | | $d_2 = 5.150000$ | | | |
| $L_5$ | 620635 | $R_6 = 24.434965$ | $t_5 = 8.356000$ | 1.622470 | 1.615480 | 1.611920 |
| | | $R_7 = -15.239962$ | | | | |
| $L_6$ | 706303 | | $t_6 = 5.659998$ | 1.711350 | 1.695380 | 1.687980 |
| | | $R_8 -28.957816$ | $d_3 = 2.473450$ | | | |

In the same view, the concave-faced output surface 94 of the fiber optic output window 88 allows for a collimator assembly 20 of only six lenses, $L_{13}$–$L_{18}$. The following Table II gives a preferred mode of prescription for the collimator lens assembly 20 of the night vision goggle system 10 of the invention, including the preferred radius of curvature $R_{29}$ of the concave-faced output surface 94:

TABLE II

Collimator Lens Assembly

| Lenses | Glass I.D. (Nos.) | Radii (mm) | Thickness and Spacing (mm) | Refractory Indices (n) at Wavelengths (λ) in Nanometers | | |
|---|---|---|---|---|---|---|
| | | | | $\lambda_1$ (546 nm) | $\lambda_2$ (480 nm) | $\lambda_3$ (643 nm) |
| $L_{13}$ | 575415 | $R_{19} = 36.321371$ | $t_{13} = 4.600000$ | 1.578300 | 1.585580 | 1.571550 |
| | | $R_{20} = -35.508841$ | | | | |
| $L_{14}$ | 728284 | $R_{21} = 399.999996$ | $t_{14} = 1.949400$ | 1.734300 | 1.748050 | 1.722000 |
| | | | $d_{10} = 0.475000$ | | | |
| $L_{15}$ | 607567 | $R_{22} = 21.462911$ | $t_{15} = 6.500000$ | 1.609940 | 1.615470 | 1.604650 |
| | | $R_{23} = 40.817992$ | | | | |
| $L_{16}$ | 755276 | $R_{24} = 122.384040$ | $t_{16} = 1.710000$ | 1.761670 | 1.776360 | 1.748530 |
| | | | $d_{11} = 11.600000$ | | | |
| $L_{17}$ | 620603 | $R_{25} = 23.317088$ | $t_{17} = 5.100000$ | 1.622860 | 1.628140 | 1.617770 |
| | | $R_{26} = -76.405867$ | $d_{12} = 1.820000$ | | | |
| $L_{18}$ | 603380 | $R_{27} = -25.679215$ | $t_{18} = 1.500000$ | 1.607180 | 1.615560 | 1.599480 |
| | | $R_{28} = 67.006164$ | $d_{13} = 5.009971$ | | | |

TABLE II-continued

Collimator Lens Assembly

| Lenses | Glass I.D. (Nos.) | Radii (mm) | Thickness and Spacing (mm) | Refractory Indices (n) at Wavelengths (λ) in Nanometers | | |
|---|---|---|---|---|---|---|
| | | | | $\lambda_1$ (546 nm) | $\lambda_2$ (480 nm) | $\lambda_3$ (643 nm) |
| | | $R_{29} = -14.388489$ | | | | |

Finally, the following Table III gives a preferred mode of prescription for each of the pair of eyepiece assemblies 24 and 26 of the night vision goggle system 10 of the invention:

It is to be understood that in the Tables I, II and III, the given preferred radii can vary by about one percent, the given preferred thickness by ±0.25 mm and the given preferred spacings by ±0.20 mm.

TABLE III

Eyepiece Lens Assembly

| Lenses | Glass I.D. (Nos.) | Radii (mm) | Thickness and Spacing (mm) | Refractory Indices (n) at Wavelengths (λ) in Namometers: | | |
|---|---|---|---|---|---|---|
| | | | | $\lambda_1$ (546 nm) | $\lambda_2$ (480 nm) | $\lambda_3$ (643 nm) |
| | | | $d_4 = 13.800000$ | | | |
| $L_7$ | 589613 | $R_9 = 30.555809$ | $t_7 = 4.100000$ | 1.591420 | 1.596350 | 1.586660 |
| | | $R_{10} = 10.947386$ | | | | |
| $L_8$ | 755276 | $R_{11} = -26.213006$ | $t_8 = 0.980942$ | 1.761670 | 1.776360 | 1.748530 |
| | | | $d_5 = 0.392380$ | | | |
| $L_9$ | 713538 | $R_{12} = 19.126310$ | $t_9 = 5.500000$ | 1.716160 | 1.722980 | 1.709620 |
| | | $R_{13} = 55.321973$ | $d_6 = 12.453708$ | | | |
| | | | $d_7 = 14.000000$ | | | |
| $L_{10}$ | 607567 | $R_{14} = -26.213006$ | $t_{10} = 3.000000$ | 1.609940 | 1.615470 | 1.604650 |
| | | $R_{15} = 13.309553$ | $d_8 = 0.700000$ | | | |
| $L_{11}$ | 755276 | $R_{16} = 26.213006$ | $t_{11} = 0.981000$ | 1.761670 | 1.776360 | 1.748530 |
| | | $R_{17} = 10.947386$ | $t_{12} = 4.100000$ | | | |
| $L_{12}$ | 589613 | $R_{18} = -30.555809$ | $d_9 = 12.000000$ | 1.591420 | 1.596350 | 1.586660 |

Figure 9:
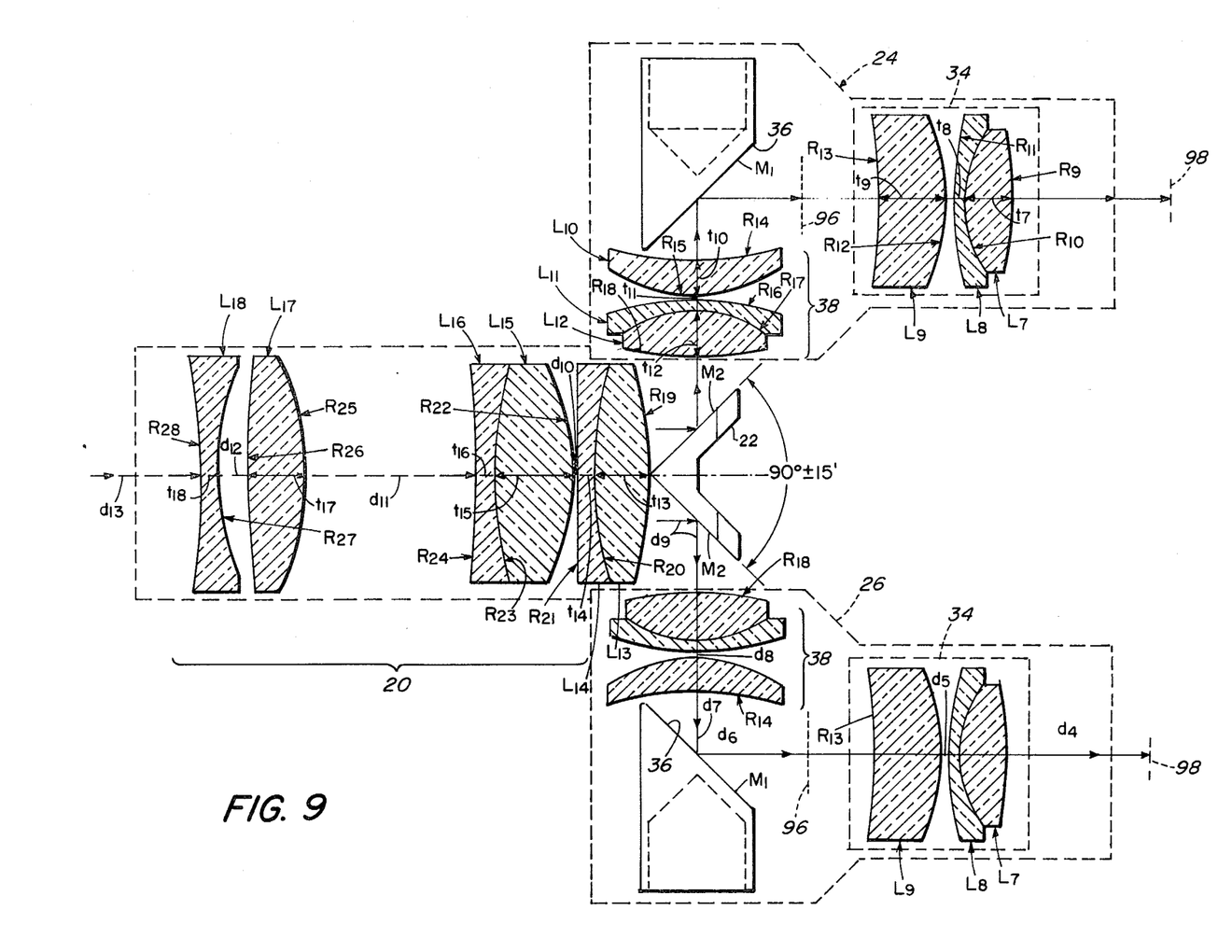
FIG. 9 is a schematic, on an enlarged scale, of the remaining portion of the optical system of the night vision goggle system of FIG. 1.

As already mentioned, the replicated mirrow ($M_1$) 36 is positioned at a 45° angle in each of the eyepiece assemblies 24 and 26, more specifically, between the focusing subassembly 34 and the second subassembly 38, as may be best observed in FIG. 9. Further, an aerial image plane 96 also is indicated, lying about midway between the focusing subassembly 34 and the replicated mirror ($M_1$) 36, substantially as shown. There is about a one degree of convergence in the viewing system to increase user eye comfort. The mirrors 36 are placed closer to the nasal side of the mechanical centerline of the eyelens axis. This in turn places the image about 0.010 mm from the mechaninal centerline of each image plane 96. An exit pupil 98, representing the eyeball of the user, also is shown in front of each of the pair of eyepiece assemblies 24 and 26. The preferred size of the exit pupil 98 is ten mm.

With focusing subassembly 35 providing individual eyepiece focus between +2 to −6 diopters, the distance $d_6$ between the surface $R_{13}$ of lens $L_9$ and the replicated mirrow ($M_1$) 36 is adjustable. The indicated value for $d_6$, i.e., 12.453708, represents the 0 diopter setting for infinity viewed from the exit pupil 98. With $d_6$ being adjustable, the sum of the respective distances $d_6$ and of $d_7$ becomes significant, however.

As mentioned, splitter member 22 is positioned between the collimator lens assembly 20 and the pair of eyepiece assemblies 24 and 26. The splitter member 22 is a metal shell, with replicated surfaces $M_2$ and is designed to split the collimated beam emanating from the collimator lens assembly 20 into respective halves, one half each for the pair of eyepiece assemblies 24 and 26. With each of the pair of eyepiece assemblies 24 and 26 being laterally slidable for interpupillary adjustment, the distance $d_9$ between the surfaces $R_{18}$ of $L_{12}$ and $R_{19}$ of $L_{13}$, is of course variable. The variation in the distance $d_9$ however is of no consequence optically since the beam striking the replicated surfaces $M_2$ is a collimated beam, emanating from the collimator lens assembly 20.

It will be noted that the wavelengths differ for the respective refractory indices of the lenses in the objective lens assembly 17 as opposed to the collimator 20 and the eyepiece assemblies 24 and 26. This is due to the fact that the image intensifier tube 18 is sensitive to both the visible and the near infrared (I. R.) rays. As a consequence, the wavelength range for the objective lens assembly 16 is broader than it is for the collimator 20 and the eyepiece assemblies 24 and 26.

It will also be noted that the size digit Glass I.D. Numbers identify the respective lenses, with the first three digits being the index portion and the last three digits being the dispersion portion.

The above described optical system of the night vision goggle system 10 of the invention achieves a system brightness gain of 2,500×, a luminance gain of 18,000×, a high contrast resolution of 1.4 milliradians, and a geometric distortion of less than three percent.

Thus it has been shown and described a general purpose night vision goggle system 10, which goggle system 10 satisfies the objects and advantages set forth above.

Since certain changes may be made in the present disclosure without departing from the scope of the present invention, it is intended that all matter described in the foregoing specification or shown in the accompanying drawings, be interpreted in an illustrative and not in a limiting sense.

What is claimed is:

1. A night vision goggle system comprising:
   (a) a housing;

(b) an optical system accommodated within said housing, said system including a pair of eyepiece assemblies;

(c) each of said pair of eyepiece assemblies slidably mounted within said housing for individual lateral adjustment of interpupillary distance;

(d) said optical system comprising an objective lens assembly, an image intensifier tube, and a collimator lens assembly, all mounted in optical axial alignment; and (e) a splitter member mounted concentric with said optical axial alignment.

2. The night vision goggle system of claim 1 further including means operatively associated with each of said pair of eyepiece assemblies for providing individual focusing thereto, and wherein each of said pair of eyepiece assemblies includes an individually adjustable focusing subassembly from +2 to −6 diopter, a flat replicated mirror and a second subassembly.

3. The night vision goggle system of claim 1 further including means for providing a wide field of view illumination designed for short distances, said means including visible indication via said optical system that said illumination is operational.

4. The night vision goggle system of claim 3 further including a detachable optical accessory designed to be mounted over said means for providing said wide field of view illumination to modify the same to a narrow field of view illumination at distances between about 100 to about 250 yards.

5. The night vision goggle system of claim 1 further including a face mask having an adjustable strap assembly, a connection designed removably to mount said housing to said face mask, and wherein said connection is of a quick-release type and being provided with a plurality of indented stops, and wherein said strap assembly is adjustable via a six-point connection to said face mask.

6. The night vision goggle system of claim 1 wherein said housing is so constructed as to enable said goggle system to be operational over a temperature range of about +45° C. to about −45° C. and in an environment of up to 99% humidity, including the capability of being immersed for up to three feet in water without adverse effects on said goggle system.

7. The night vision goggle system of claim 1 wherein said objective lens assembly comprises three cemented doublet lens components, having a focal length of about 26 mm and a relative aperture of f/1, and wherein said objective lens assembly is mounted for limited axial displacement by rotation within said housing over an 135° arc so as to adjust the focus thereof over a predetermined range.

8. A night vision goggle system comprising:

(a) a housing;

(b) an optical system accomodated within said housing, said system including a pair of eyepiece assemblies;

(c) each of said pair of eyepiece assemblies slidably mounted within said housing for individual adjustment of interpupillary distance;

(d) said optical system comprising an objective lens assembly, an image intensifier tube, and a collimator lens assembly, all mounted in optical axial alignement, and a splitter member mounted concentric with said optical axial alignment;

(e) said objective lens assembly three cemented doublet lens components, having a focal length of about 26 mm and a relative aperture of f/1;

(f) said three cemented doublet lens components include a first cemented doublet lens component having a convex surface on the object side with a radius of curvature $R_1$, an interfacial radius of curvature $R_2$, and a convex surface on the rear side with a radius of curvature $R_3$, vertex thickness $t_1$ and $t_2$ and respective refractive indices $n_1-n_6$ at three respective wavelengths; a second cemented doublet lens component having a front convex surface with a radius of curvature $R_4$, and interfacial radius of curvature $R_5$ and a plane rear surface $P_1$, vertex thickness $t_3$ and $t_4$, and refractive indices $n_7-n_{12}$ and at said three respective wavelenghts; a third cemented doublet lens component having a front convex surface with a radius of curvature $R_6$, an interfacial radius of curvature $R_7$ and a plane rear surface $P_2$, vertex thicknesses $t_5$ and $t_6$, and refractive indices $n_{13}-n_{18}$; with an airspace $d_1$ reserved between said first and second doublet lens components and an airspace $d_2$ reserved between said second and third doublet lens components.

9. The night vision goggle system of claim 1 wherein said image intensifier tube includes an input fiber optic window formed with a concave input surface facing toward said objective lens assembly and having a radius of curvature $R_8$ and an output fiber optic formed with a concave output surface facing toward said collimator lens assembly and having a radius of curvature $R_{29}$.

10. A night vision goggle system comprising:

(a) a housing;

(b) an optical system accommodated within said housing, said system including a pair of eyepiece assemblies;

(c) each of said pair of eyepiece assemblies slidably mounted within said housing for individual adjustment of interpupillary distance;

(d) means operatively associated with each of said pair of eyepiece assemblies for providing individual focusing thereto;

(e) each of said pair of eyepiece assemblies including a focusing subassembly, a replicated mirror and a second subassembly;

(f) said focusing subassembly comprising a first cemented doublet leans component having a convex surface on the eyeball side with a radius of curvature $R_6$, an interfacial radius of curvature $R_{10}$, and an convex surface on the distal side with a radius of curvature $R_{11}$, vertex thicknesses $t_7$ and $t_8$, and refractive indices $n_{19}-n_{24}$ respectively at three predetermined wavelengths, and a second positive meniscus lens component having a convex surface with a radius of curvature $R_{12}$ and a concave surface with a radius of curvature $R_{13}$, a vertex thickness $t_9$ and refractive indices $n_{25}$, $n_{26}$ and $n_{27}$ at said three predetermined wavelengths, with an airspace $d_5$ reserved between said first and second lens components.

11. The night vision goggle system of claim 10 wherein said second subassembly comprises a first positive meniscus lens component having a concave surface with a radius of curvature $R_{14}$ and a convex surface with a radius of curvature $R_{15}$, a vertex thickness $t_{10}$ and refractive indices $n_{28}$, $n_{29}$ and $n_{30}$ at three predetermined wavelengths, and a second cemented doublet lens component having a convex surface with a radius of curvature $R_{16}$, an interfacial radius of curvature $R_{17}$, and a convex surface with a radius of curvature $R_{18}$, respective vertex thicknesses $t_{11}$ and $t_{12}$, and refractive indices $n_{31}-n_{36}$ respectively at said three predetermined wavelengths, with an airspace $d_8$ reserved between said first and second lens components.

tive indices $n_{47}-n_{49}$, with an airspace $d_{12}$ reserved between said two lenses and an airspace $d_{11}$ reserved between said first and second lens groups.

13. The night vision goggle system of claim 8 wherein the preferred characteristics of said three cemented doublet lens components are as follows:

| Lenses | Glass I.D. Nos. | Radii (mm) | Thickness and Spacing (mm) | Refractory Indices (n) at Wavelengths (λ) in Nanometers: | | |
|---|---|---|---|---|---|---|
| | | | | $\lambda_1$ 546 nm | $\lambda_2$ (706 nm) | $\lambda_3$ (852 nm) |
| $L_1$ | 533580 | $R_1 = 39.129003$<br>$R_2 = -32.156408$ | $t_1 = 7.999999$ | 1.535340 | 1.528770 | 1.525420 |
| $L_2$ | 683445 | $R_3 = -1000.000393$ | $t_2 = 1.564999$<br>$d_1 = 0.782499$ | 1.686370 | 1.675610 | 1.670420 |
| $L_3$ | 620635 | $R_4 = 28.1682$<br>$R_5 = -31.546746$ | $t_3 = 13.302490$ | 1.622470 | 1.615480 | 1.611920 |
| $L_4$ | 706303 | | $t_4 = 6.259997$<br>$d_2 = 5.150000$ | 1.711350 | 1.695380 | 1.687980 |
| $L_5$ | 620635 | $R_6 = 24.434965$<br>$R_7 = -15.239962$ | $t_5 = 8.356000$ | 1.622470 | 1.615480 | 1.611920 |
| $L_6$ | 706303 | | $t_6 = 5.659998$ | 1.711350 | 1.695380 | 1.687980 |

12. The night vision goggle system of claim 1 wherein said collimator lens assembly comprises a first lens group of two cemented doublets having respective radii $R_{19}$ through $R_{24}$, vertex thicknesses $t_{13}$ through $t_{16}$ respectively, and refractive indices $n_{32}$ through $n_{43}$ respectively at three predetermined wavelengths, with an airspace $d_{10}$ reserved between said doublets, and a second lens group of two lenses consisting of a double convex lens having radii $R_{25}$ and $R_{26}$, a vertex thickness $t_{17}$ and refractive indices $n_{44}-n_{46}$ at said three predetermined wavelengths, and of a double concave lens having radii $R_{27}$ and $R_{28}$, a vertex thickness $t_{18}$ and refrac- 14. The night vision goggle system of claim 9 wherein preferably $R_8$ is $-28.957816$ mm and $R_{29}$ is $-14.388489$ mm.

15. The night vision goggle system of claim 10 wherein the preferred characteristics of said focusing subassembly are as follows:

| Lenses | Glass I.D. Nos. | Radii (mm) | Thickness and Spacing (mm) | Refractory Indices (n) at Wavelengths (λ) in Nanometers: | | |
|---|---|---|---|---|---|---|
| | | | | $\lambda_1$ (546 nm) | $\lambda_2$ (706 nm) | $\lambda_3$ (852 nm) |
| $L_7$ | 589613 | $R_9 = 30.555809$<br>$R_{10} = -10.947386$ | $d_4 = 13.800000$<br>$t_7 = 4.100000$ | 1.591420 | 1.596350 | 1.586660 |
| $L_8$ | 755276 | $R_{11} = -26.213006$ | $t_8 = 0.980942$<br>$d_5 = 0.392380$ | 1.761670 | 1.776360 | 1.748530 |
| $L_9$ | 713538 | $R_{12} = 19.126310$<br>$R_{13} = 55.321973$ | $t_9 = 5.500000$<br>$d_6 = 12.453708$<br>$d_7 = 14.000000$ | 1.716160 | 1.722980 | 1.709620 |

16. The night vision goggle system of claim 11 wherein the preferred characteristics of said second subassembly are as follows:

| Lenses | Glass I.D. Nos. | Radii (mm) | Thickness and Spacing (mm) | Refractory Indices (n) at Wavelengths (λ) in Nanometers: | | |
|---|---|---|---|---|---|---|
| | | | | $\lambda_1$ (546 nm) | $\lambda_2$ (706 nm) | $\lambda_3$ (852 nm) |
| $L_{10}$ | 607567 | $R_{14} = -26.213006$<br>$R_{15} = -13.309553$ | $t_{10} = 3.000000$<br>$d_8 = 0.700000$ | 1.609940 | 1.615470 | 1.604650 |
| $L_{11}$ | 755276 | $R_{16} = 26.213006$<br>$R_{17} = 10.947386$ | $t_{11} = 0.981000$<br>$t_{12} = 4.100000$ | 1.761670 | 1.776360 | 1.748530 |
| $L_{12}$ | 589613 | $R_{18} = -30.555809$ | | 1.591420 | 1.596350 | 1.586660 |

17. The night vision goggle system of claim 12 wherein the preferred characteristics of said collimator lens assembly are as follows:

| Lenses | Glass I.D. (Nos.) | Radii (mm) | Thickness and Spacing (mm) | Refractory Indices (n) at Wavelengths (λ) in Nanometers | | |
|---|---|---|---|---|---|---|
| | | | | $\lambda_1$ (546 nm) | $\lambda_2$ (480 nm) | $\lambda_3$ (643 nm) |
| $L_{13}$ | 575415 | $R_{19} = 36.321371$<br>$R_{20} = -35.508841$ | $t_{13} = 4.600000$ | 1.578300 | 1.585580 | 1.571550 |
| $L_{14}$ | 728284 | $R_{21} = 399.999996$ | $t_{14} = 1.949400$<br>$d_{10} = 0.475000$ | 1.734300 | 1.748050 | 1.722000 |
| $L_{15}$ | 607567 | $R_{22} = 21.462911$ | $t_{15} = 6.500000$ | 1.609940 | 1.615470 | 1.604650 |

-continued

| Lenses | Glass I.D. (Nos.) | Radii (mm) | Thickness and Spacing (mm) | Refractory Indices (n) at Wavelengths ($\lambda$) in Nanometers | | |
|---|---|---|---|---|---|---|
| | | | | $\lambda_1$ (546 nm) | $\lambda_2$ (480 nm) | $\lambda_3$ (643 nm) |
| $L_{16}$ | 755276 | $R_{23} = -40.817992$<br>$R_{24} = 122.384040$ | $t_{16} = 1.710000$<br>$d_{11} = 11.600000$ | 1.761670 | 1.776370 | 1.748530 |
| $L_{17}$ | 620603 | $R_{25} = 23.317088$<br>$R_{26} = -76.405867$ | $t_{17} = 5.100000$<br>$d_{12} = 1.820000$ | 1.622860 | 1.628140 | 1.617770 |
| $L_{18}$ | 603380 | $R_{27} = -25.679215$<br>$R_{28} = 67.006164$ | $t_{18} = 1.500000$ | 1.607180 | 1.615560 | 1.599480 |

* * * * *